United States Patent
Watanabe

(10) Patent No.: US 8,988,597 B2
(45) Date of Patent: Mar. 24, 2015

(54) IMAGING CONTROL DEVICE AND PROGRAM FOR CONTROLLING FACIAL IMAGE TAKING APPARATUS WHICH RADIATES INFRARED LIGHT TOWARD THE FACE

(71) Applicant: DENSO CORPORATION, Kariya, Aichi-pref. (JP)

(72) Inventor: Taito Watanabe, Obu (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 13/770,316

(22) Filed: Feb. 19, 2013

(65) Prior Publication Data
US 2013/0222642 A1    Aug. 29, 2013

(30) Foreign Application Priority Data
Feb. 24, 2012    (JP) .................................. 2012-38830

(51) Int. Cl.
*H04N 5/238* (2006.01)
*H04N 5/232* (2006.01)
*H04N 5/235* (2006.01)
*H04N 9/73* (2006.01)

(52) U.S. Cl.
CPC ......... *H04N 5/23219* (2013.01); *H04N 5/2354* (2013.01)
USPC ......... 348/366; 348/227.1; 348/234; 348/362

(58) Field of Classification Search
CPC . H04N 5/2351; H04N 5/235; H04N 5/23216; H04N 5/23219; H04N 5/2353
USPC .......................... 348/234, 362, 364, 366, 371
See application file for complete search history.

(56) References Cited

U.S. PATENT DOCUMENTS

| | | | |
|---|---|---|---|
| 5,801,763 A | 9/1998 | Suzuki | |
| 2004/0005086 A1* | 1/2004 | Wolff et al. | 382/118 |
| 2008/0089559 A1* | 4/2008 | Koumura | 382/117 |
| 2008/0267600 A1 | 10/2008 | Omi | |

(Continued)

FOREIGN PATENT DOCUMENTS

| | | |
|---|---|---|
| JP | 2003-296712 A | 10/2003 |
| JP | 4103495 B2 | 6/2008 |

(Continued)

OTHER PUBLICATIONS

Office action dated Feb. 25, 2014 in the corresponding Korean patent application No. 10-2013-0018986 (and English translation).

(Continued)

*Primary Examiner* — Hung Lam
(74) *Attorney, Agent, or Firm* — Posz Law Group, PLC

(57) ABSTRACT

An imaging control device for controlling a facial image taking apparatus which radiates light from a light source to a face and takes an image of the face is disclosed. The imaging control device determines an intensity of environmental light and a degree of reflection by a pair of eyeglasses. When it is determined that the intensity of the environmental light is greater than or equal to a predetermined determination value and the degree of the reflection by the eyeglasses is greater than or equal to a predetermined determination value, the imaging control device sets an intensity of the light radiated from the light source to a predetermined intensity that makes states of eyes in the facial image recognizable.

4 Claims, 6 Drawing Sheets

(56) References Cited

U.S. PATENT DOCUMENTS

| | | | |
|---|---|---|---|
| 2009/0244288 A1 | 10/2009 | Fujimoto et al. | |
| 2009/0251534 A1* | 10/2009 | Fujimoto et al. | 348/78 |
| 2010/0254571 A1 | 10/2010 | Matsuura et al. | |
| 2013/0088156 A1* | 4/2013 | Nam et al. | 315/158 |

FOREIGN PATENT DOCUMENTS

| | | |
|---|---|---|
| JP | 4151341 B2 | 9/2008 |
| KR | 1998-047573 A | 9/1998 |

OTHER PUBLICATIONS

Examination Report dated Aug. 26, 2014 in the corresponding Korean patent application No. 10-2013-0018986 (and English translation).

Office Action mailed Jan. 20, 2015 issued in corresponding JP patent application No. 2012-038830 (and English translation).

* cited by examiner

NO SCENERY REFLECTION

SCENERY REFLECTION

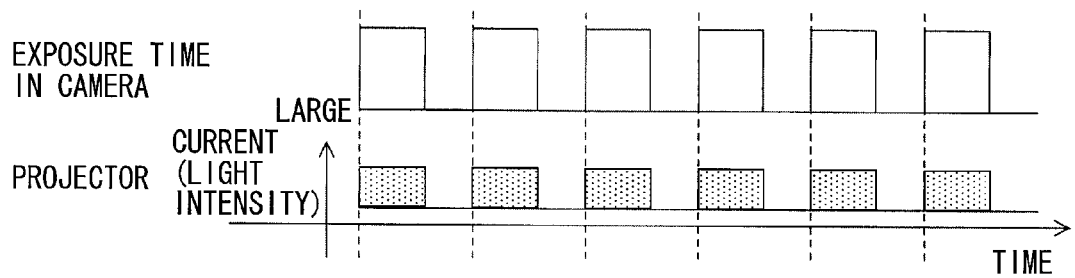
FIG. 4A  CONTROL IN PATTERN 1 (OPE MODE 1: 1ST EXAMPLE)
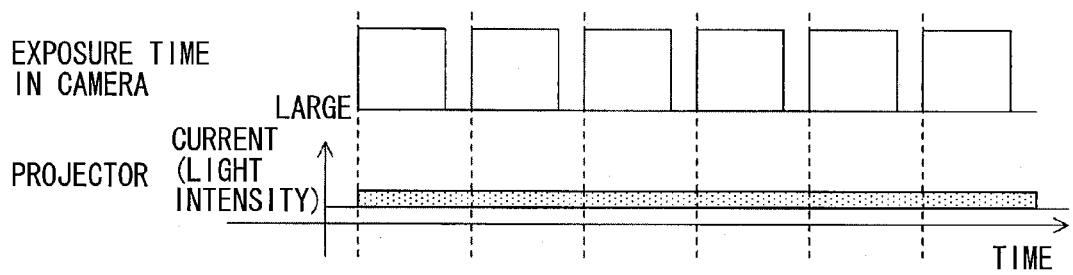
FIG. 4B  CONTROL IN PATTERN 1 (OPERATION MODE 1: 2ND EXAMPLE)
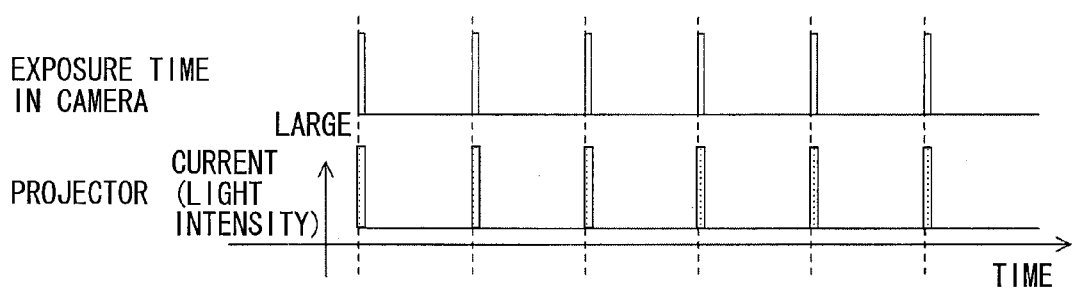
FIG. 4C  CONTROL IN PATTERN 4

FIG. 7

| IMAGING SITUATION | ENVIRONMENT LIGHT (CONDITION A) | EYEGLASSES (CONDITION B) | REFLECTION (CONDITION C) | CTRL METHOD (OPE MODE) |
|---|---|---|---|---|
| PATTERN 1 | WEAK (DARK) | – | – | (OPE MODE 1) ILLUMINATION ↓ ILLUMINATION TIME ↑ EXPOSURE TIME ↑ |
| PATTERN 2 | INTENSE (BRIGHT) | ABSENT | – | (OPE MODE 2) NO ILLUMINATION |
| PATTERN 3 | INTENSE | PRESENT | ABSENT | (OPE MODE 3) NO ILLUMINATION |
| PATTERN 4 | INTENSE | PRESENT | PRESENT | (OPE MODE 4) ILLUMINATION ↑ ILLUMINATION TIME ↓ EXPOSURE TIME ↓ |

FIG. 8

| IMAGING SITUATION | ENVIRONMENTAL LIGHT (CONDITION A) | EYEGLASSES REFLECTION (CONDITION C) | CTRL METHOD (OPE MODE) |
|---|---|---|---|
| PATTERN 1 | WEAK (DARK) | – | (OPE MODE 1) ILLUMINATION ↓ ILLUMINATION TIME ↑ EXPOSURE TIME ↑ |
| PATTERN 2 | INTENSE (BRIGHT) | ABSENT | (OPE MODE 3) NO ILLUMINATION |
| PATTERN 3 | INTENSE | PRESENT | (OPE MODE 4) ILLUMINATION ↑ ILLUMINATION TIME ↓ EXPOSURE TIME ↓ |

US 8,988,597 B2

IMAGING CONTROL DEVICE AND PROGRAM FOR CONTROLLING FACIAL IMAGE TAKING APPARATUS WHICH RADIATES INFRARED LIGHT TOWARD THE FACE

CROSS REFERENCE TO RELATED APPLICATION

The present application is based on Japanese Patent Application No. 2012-38830 filed on Feb. 24, 2012, disclosure of which is incorporated herein by reference.

TECHNICAL FIELD

The present disclosure relates to an imaging control device and a program that are used to take, for example, a facial image of a driver (operator) of a vehicle.

BACKGROUND

A technology for detecting an undesirable driver state in terms of a driving operation, such as looking aside while driving and drowsy driving, has been developed. In such a technology, the face of the driver is photographed with a camera to obtain a facial image of the driver and the facial image is analyzed to detect the driver state (e.g., JP-2003-296712A, JP-2008-123137A corresponding to US2009/0251534A, JP-3316725B corresponding to US-5801763B, JP-2009-116797A corresponding to US2010/0254571A, and JP-2008-276328A corresponding to US2008/0267600A).

For instance, the positions of eyes (e.g., black eyes or pupils) of a driver are detected to detect a looking-aside state. The open/closed states of eyes (eye lids) of the driver are detected to detect sleepiness.

In order to obtain a stable image in taking the image with the camera, a light source (projector) radiates a necessary amount of light (e.g., infrared light) toward the face and its surroundings by, e.g., pulse lighting.

However, the inventor of the present application has found out that if the driver is wearing a pair of eyeglasses, it is difficult to highly accurately obtain eye-related information such as the positions of eyes, the open/closed states of eyes, or the like.

SUMMARY

In view of the foregoing, it is an object of the present disclosure to provide an imaging control device and a program that can highly accurately obtain eye-related information even if a user is wearing eyeglasses.

According to an example of the present disclosure, an imaging control device controls a facial image taking apparatus which radiates light including infrared light from a light source to a face and which takes an image of the face to obtain a facial image by using an imaging unit. The imaging control device includes an environmental light determining section, an eyeglass reflection determining section and a light control section. The environmental light determining section determines an intensity of environmental light based on information from an environmental light sensing unit sensing the intensity of the environmental light. The eyeglass reflection determining section determines a degree of reflection by a pair of eyeglasses on the face based on the facial image. In cases where the environmental light determining section determines that the intensity of the environmental light is greater than or equal to a predetermined determination value and the eyeglass reflection determining section determines that the degree of the reflection by the eyeglasses is greater than or equal to a predetermined determination value, the light control section sets an intensity of the light radiated from the light source to a predetermined intensity that makes it possible to recognize states of eyes in the facial image.

According to another example of the present disclosure, a non-transitory computer readable storage medium stores therein a computer-executable program that cause a computer to function as the environmental light determining section, the eyeglass reflection determining section and the light control section of the above imaging control device.

The above imaging control device and the above non-transitory computer readable storage medium make it possible to highly accurately obtain eye-related information even if a user is wearing eyeglasses.

BRIEF DESCRIPTION OF THE DRAWINGS

The above and other objects, features and advantages of the present disclosure will become more apparent from the following detailed description made with reference to the accompanying drawings. In the drawings:

FIG. 4A is a timing chart illustrating a first example of a control operation in a first pattern performed by the imaging control device FIG. 4B is a timing chart illustrating a second example of the control operation in the first pattern performed by the imaging control device;

FIG. 4C is a timing chart illustrating a control operation in a fourth pattern performed by the imaging control device;

FIG. 7 is a diagram illustrating a relation among environmental light, presence/absence of eyeglasses, absence/absence of reflection in the eyeglasses, and operation mode in accordance with one embodiment; and FIG. 8 is a diagram illustrating a relation among environmental light, absence/absence of reflection in the eyeglasses, and operation mode in accordance with a modification example

DETAILED DESCRIPTION

Figure 6:
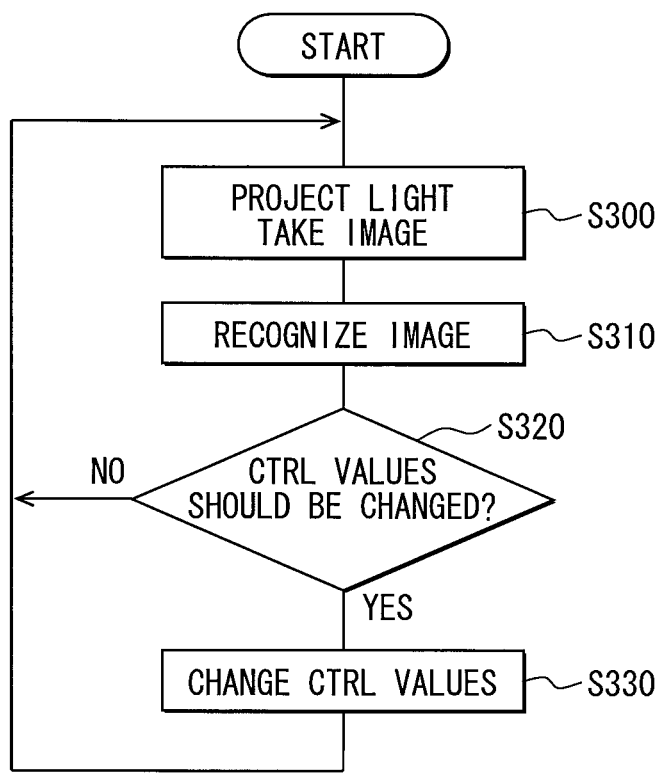
FIG. 6 is a flow chart illustrating control processing of related-art.

As a related art, explanation will be given on why it becomes difficult to highly accurately obtain eye-related information when a user is wearing eyeglasses. As shown in FIG. 6, an image suited for analyzing a facial image may be obtained in a procedure as shown in FIG. 6. First, a projector radiates light and a camera takes an image (S300). The obtained facial image (captured image) is recognized (S310). Based on the captured image, it is determined whether or not control values (e.g., a radiation time, an exposure time, and an analog gain) should be changed (S320). When it is determined that the control values should be changed, the control values are changed.

In the above procedure, when a driver is wearing a pair of eyeglasses and environmental light (ambient light such as external light) is intense during the daytime or the like, scenery is reflected in the eyeglasses, in other words, the environmental light is reflected by the glass portions of the eyeglasses.

When the scenery is reflected in the eyeglasses, the positions of the eyes, the open/closed states of the eyes and the like cannot be precisely detected from the facial image, and therefore the looking aside or dozing of the driver cannot be accurately sensed.

For addressing the above difficulty, the inventor of the present application has considered that a large current is provided to the projector to apply intense illumination to the driver's face in order to reduce the reflection of the scenery. However, a circuit may become scaled up and, continuous application of intense light to the face may provide the driver with discomfort.

The inventor of the present application has also considered that in order to reduce the reflection of scenery, it may be possible to arrange a large number of LEDs in array as a light source. However, this light source occupies a large area and scales up a device configuration and is not realistic.

In view of the foregoing, the inventor of the application has studied an image sensing control device that can highly accurately obtain eye-related information (e.g., positions of eyes) while minimizing such difficulties as the scaling up of the device or the driver's discomfort even when environmental light is reflected by the glass portions of eyeglasses.

Embodiments will be described below with reference to the drawings.

Embodiment (a) First, a system configuration of a vehicle equipped with an imaging control device of one embodiment will be described based on FIGS. 1 and 2.

Figure 1:
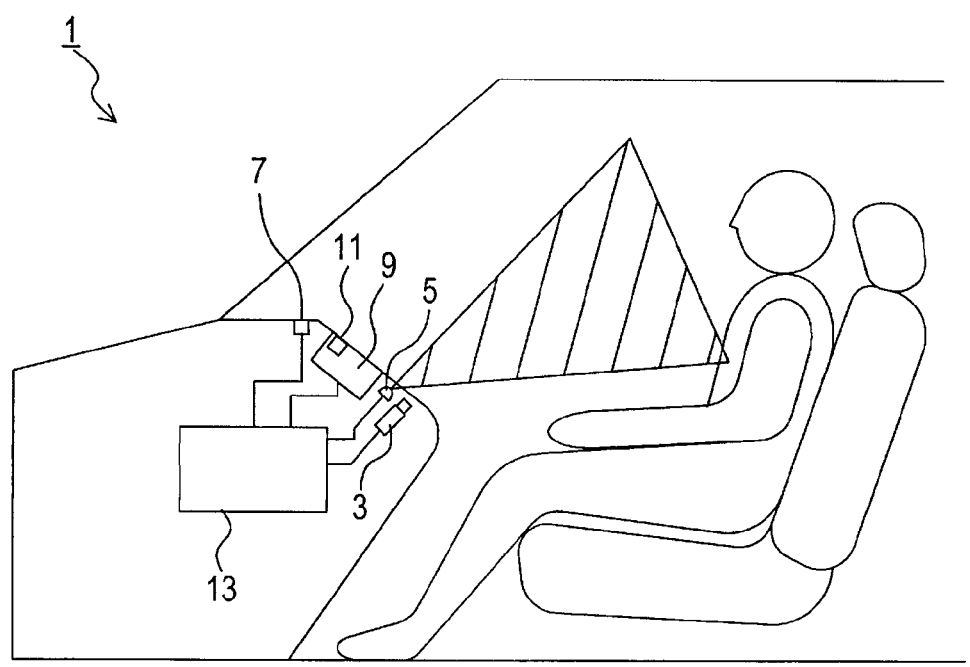
FIG. 1 is a diagram illustrating a system configuration of a facial image taking apparatus 1 including an imaging control device of one embodiment.
Figure 2:
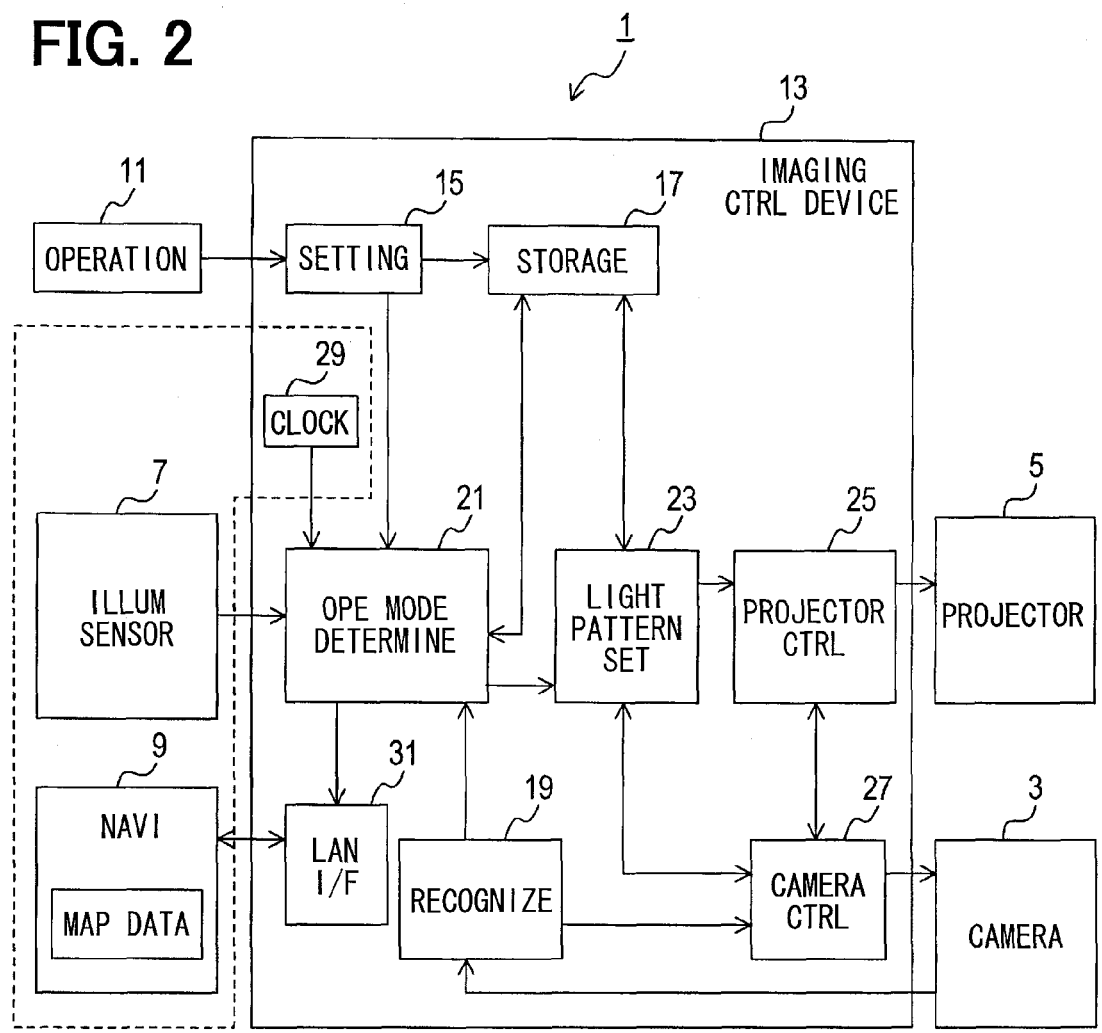
FIG. 2 is a diagram illustrating a hardware configuration of the imaging control device.

As shown in FIGS. 1 and 2, a facial image taking apparatus 1 capable of taking a facial image of an occupant (e.g., a driver) and obtaining necessary information, such as the positions of eyes or the like, from the facial image is mounted in the vehicle (e.g., automobile) to enable control operations such as driving assistance and the like.

The facial image taking apparatus 1 includes a camera 3 for taking an image of the face of the driver, an image sensing projector 5 for radiating light to the face of the driver or the like, an illuminance sensor 7 for sensing ambient brightness, a navigation device 9, an operation unit 11 for allowing a user to input a manual operation, and an imaging control device 13 for performing control of the operations of the foregoing components and the like.

The camera 3 can correspond to an example of imaging unit. The camera 3 may be, for example, a CCD camera capable of taking an image by infrared light and having a given sensitivity to the infrared light. The camera 3 is disposed in the vicinity of a meter (indicator) so that the camera 3 can take, for example, an image of the driver's face from an in obliquely front-lower position of the driver's face.

The projector 5 includes, for example, an infrared LED and is disposed substantially coaxially with the camera 3 so that the projector 5 radiates infrared light toward the driver's face. It should be noted that a region covered by the radiation is in a substantially conical shape centered on the driver's face. The projector 5 can correspond to an example of light source.

The illuminance sensor 7 includes an environmental light sensor (environmental light sensing unit) disposed in, e.g., a dashboard or the like to sense ambient brightness (ambient light, i.e., environmental light). The illuminance sensor 7 can correspond to an example of environmental light sensing unit. The illuminance sensor 7 can sense an environmental light weak state, an environmental light strong state, and the like. The environmental light weak state is a state in which the environmental light is weak (it is dark) and corresponds to the nighttime or the like. The environmental light strong state is a state in which the environmental light is intense (it is bright) and corresponds to the daytime or the like.

The navigation device 9 performs various navigation operations such as displaying the position of the vehicle equipped with the navigation device 9 on a map and providing route guidance, and the like. Thus, the navigation device 9 can detect a situation in which, e.g., the vehicle is running at a place with weak environmental light such as in a tunnel.

The operation unit 11 includes a switch and the like for a driver or the like to perform a manual operation. The operation unit 11 can enable the driver or the like to input various instructions such as turning ON/OFF imaging control, setting various control values (e.g., the intensity of radiated light), and the like.

The imaging control unit 13 may be an electronic control unit including a microcomputer and controls the state of radiation of the infrared light from the projector 5 (e.g., the intensity of the radiated light or radiation timing), the state of imaging by the camera 3 (e.g., an exposure time or an analog gain), or the like based on image information from the camera 3, a signal from the illuminance sensor 7, map information from the navigation device 9, and the like.

As shown in FIG. 2, the imaging control device 13 includes a setting unit 15, a storage unit 17, a recognition unit 19, an operation mode determination unit 21, a light emission pattern setting unit 23, a projector control unit 25, and an imaging control unit 27, as functional blocks. The imaging control device 13 also includes a clock IC 29 for keeping time and outputting a clock time to the operation mode determination unit 21, and a LAN interface (I/F) 31 for performing information transmission to/from the navigation device 9.

The setting unit 15 receives an input from the operation unit 11 and performs various settings for the imaging control device 13.

The storage unit 17 stores various data necessary for the imaging control device 13 to perform operations. The storage unit 17 stores data of operation modes of the projector 5 and the camera 3, and data of patterns of light emission from the projector 5.

The recognition unit 19 processes and analyzes image information from the camera 3 or the like to perform various face-related recognition operations. For example, the recognition unit 19 recognize the presence and absence of a pair of eyeglasses, the reflection of scenery in the glass (lens) portions of the eyeglasses, the positions of the pupils of eyes, the open/closed states of the eyes, or the like. The recognition unit 19 also determines, from the image information, the state of radiation of the light from the projector 5, an exposure state in the camera 3, whether or not the analog gain is proper, or the like.

The operation mode determination unit 21 determines and selects, from the signal from the illuminance sensor 7 or information from the recognition unit 19, a proper operation mode as the operation mode of the projector 5 and the camera 3.

The light emission pattern setting unit 23 sets the pattern of light emission from the projector 5 based on information from the operation mode determination unit 21 or the like.

The projector control unit 25 controls the projector 5 so that the projector 5 radiates the light in the light emission pattern set by the light emission pattern setting unit 23.

The imaging control unit 27 controls the camera 3 (e.g., the exposure time) based on information obtained in the recognition unit 19 (such as, e.g., information on the presence/absence of a pair of eyeglasses or the state of reflection in the eyeglasses), information on the light emission pattern obtained from the light emission pattern setting unit 23, or information for controlling the projector 5 obtained from the projector control unit 25.

Note that the setting unit 15, the recognition unit 19, the operation mode determination unit 21, the pattern setting unit 23, the projector control unit 25, and the imaging control unit 27 each described above can be implemented by the microcomputer having a CPU, and the storage unit 17 can be implemented by a nonvolatile memory such as, e.g., an EEPROM.

(b) Next, based on FIGS. 3A and 3B and 4A to 4C, the determination of the operation mode and the control according to the operation mode will be described.

In the present embodiment, depending on whether or not there is reflection of scenery in the glass portions of the eyeglasses, the content of control of the projector 5 and the camera 3 is changed.

Figure 3A:
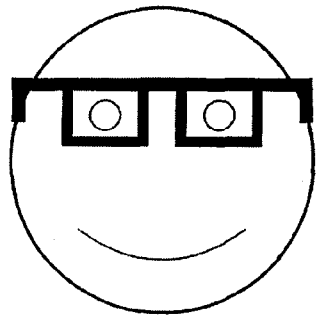
FIG. 3A is a diagram illustrating an absence of reflection of environmental light in glass portions of a pair of eyeglasses.
Figure 3B:
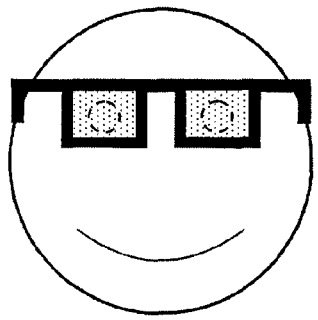
FIG. 3B is a diagram illustrating a presence of the reflection of environmental light in the glass portions of the pair of eyeglasses.

That is, as shown in FIG. 3A, when there is no reflection of scenery in the glass portions of the eyeglasses, the positions of the pupils of the eyes and the open/closed states of the eyes can be accurately recognized. However, as shown in FIG. 3B, in the case of a blight state (state with intense environmental light) during, e.g., the daytime or the like, there is refection of scenery in the glass portions of the eyeglasses. In this case, a pixel value (brightness) in the glass regions of the eyeglasses in a facial image increases, and the positions of the pupils of the eyes and the open/closed states of the eyes cannot be accurately recognized. As a result, it may be impossible to accurately detect the state of looking aside while driving or drowsy driving.

Accordingly, in the present embodiment, when it is determined that there is reflection of scenery in the glass portions of the eyeglasses, a control operation for increasing the intensity of the light radiated from the projector 5 is performed to eliminate the reflection of scenery, in order to accurately detect the states of the eyes.

Specifically, in the present embodiment, as shown in FIG. 7, an imaging situation is determined under the three conditions of the state of environmental light (Condition A), the presence/absence of a pair of eyeglasses (Condition B), and the presence/absence of eyeglass reflection (reflection of scenery) (Condition C). In accordance with a result of the determination, the content of the control operation is changed. That is, the control operation is performed selectively in one of operation modes 1 to 4 corresponding to patterns 1 to 4.

Specifically, the pattern 1 is directed to a situation where the environmental light is weak (e.g., dark during the nighttime, etc.). In pattern 1, a control operation in operation mode 1 is performed on assumption that there is no reflection of environmental light by the eyeglasses. That is, as shown by way of example in FIGS. 4A and 4B, compared with the case where environmental light is intense in the pattern 4, the projector 5 is controlled to weaken illumination and increase illumination time, while the camera 3 is controlled to increase the exposure time. Note that, in radiating the light, the projector 5 radiates pulsewise light multiple times (the same is applied hereinafter).

That is, since it is dark during the nighttime or the like, the projector 5 radiates light of a needed intensity for a long time while the exposure time in the camera 3 increases, in order to obtain a clear facial image. Note that the intensity of the radiated light can be adjusted using, e.g., the magnitude of a current applied to the infrared LED.

Pattern 2 is directed to a situation where the environmental light is intense (bright during the daytime, etc.) and no eyeglasses are worn. In pattern 2, since no eyeglasses are worn, the difficulty resulting from the reflection of environmental light does not occur. Accordingly, the projector 5 is not turned ON.

That is, since it is bright during the daytime or the like, a clear facial image is obtainable without radiating light. Accordingly, in operation mode 2, an image is taken with the camera 3 in a normal operation (including a preset exposure time or the like) without radiating light from the projector 5.

Pattern 3 is directed to a situation where the environmental light is intense, the pair of eyeglasses are worn, and there is no reflection of environmental light by the eyeglasses. In pattern 3, although the eyeglasses are worn, the projector 5 is not turned ON since there is no reflection.

That is, since there is no reflection and also it is bright during the daytime or the like although the eyeglasses are worn, a clear facial image is obtainable without radiating light. Accordingly, in operation mode 3, an image is taken with the camera 3 in the normal operation without radiating light from the projector 5. Note that in each of operation modes 2 and 3, the same operation is performed.

Pattern 4 is directed to a situation where the environmental light is intense and the pair of eyeglasses are worn and there is reflection of the environmental light by the eyeglasses. In pattern 4, as shown in FIG. 4C, in order to eliminate reflection of the environmental light, the projector 5 is controlled to intensify illumination and reduce the illumination time compared to the case where the environmental light is weak in pattern 1 described above, while the camera 3 is controlled to reduce the exposure time.

That is, even in a bright state during the daytime or the like, there is reflection by the eyeglasses. Thus, in order to eliminate the influence of the reflection and obtain a clear facial image (image from which the states of the eyes are recognizable), light of a sufficient intensity is radiated from the projector 5 for a short time while the exposure time in the camera 3 is reduced in operation mode 4.

In other words, because the intense light is radiated, the light passes through the glass portions of the eyeglasses and reaches the eyes, so that a facial image from which the states of the eyes are clearly recognizable is obtained. Here, the radiation time is reduced in order to reduce driver's discomfort. In addition, the exposure time is reduced so that an excessive increase in the brightness of the facial image due to the high intensity of light is prevented.

Note that, in cases where the intensity of the light is changed (increased or reduced) in patterns 1 and 4, a predetermined reference value may be set and the intensity of the light may be controlled such that the intensity of the light is changed from the reference value. For example, when the intensity of environmental light is classified into a weak range (corresponding to pattern 1), an intermediate range and an intense range (corresponding to pattern 4), the reference value for the intensity of the light may be set to correspond to the "intermediate range.

Figure 5:
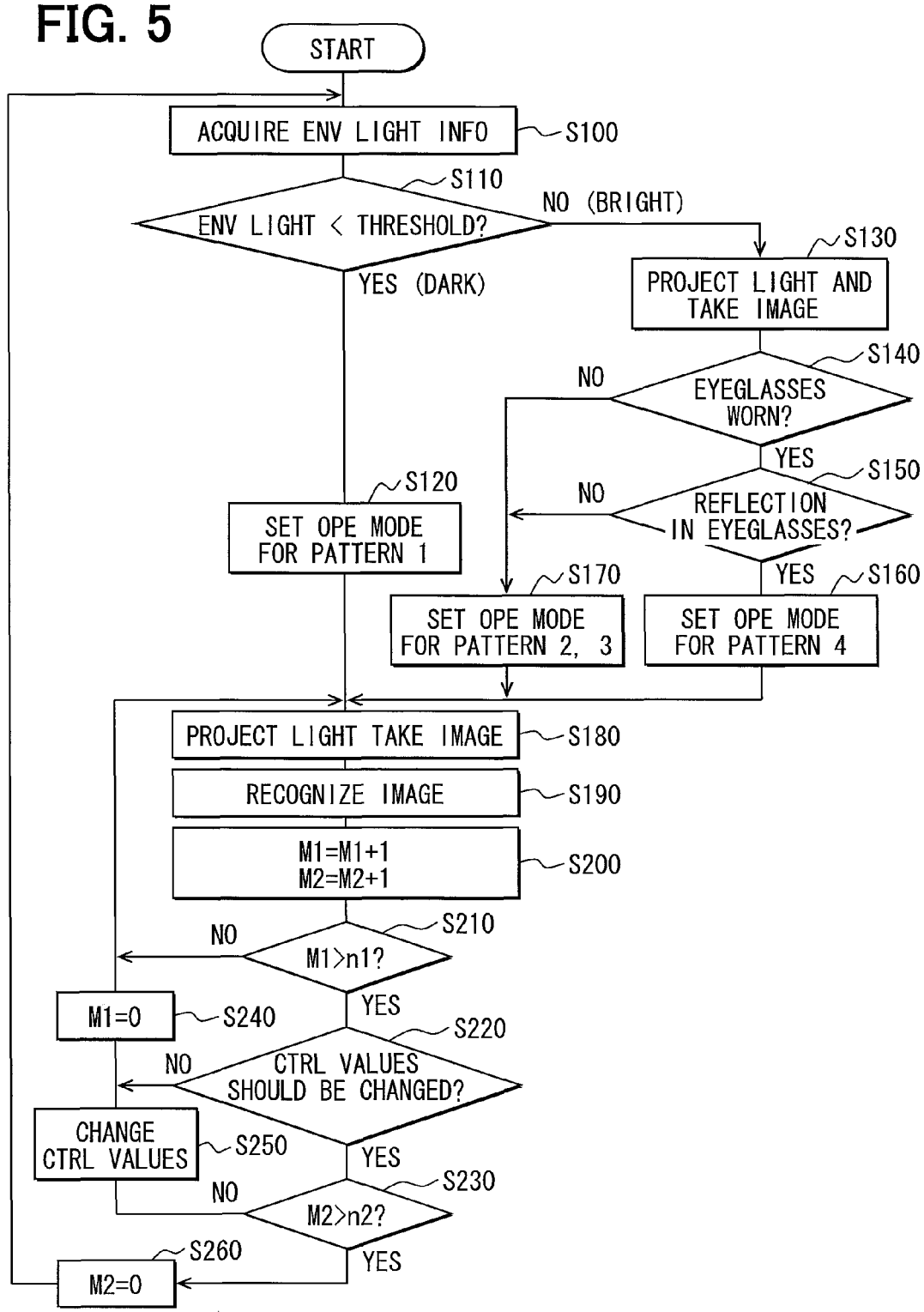
FIG. 5 is a flow chart illustrating control processing performed by the imaging control device of one embodiment.

(c) Next, control processing performed in the imaging control device 13 will be described based on FIG. 5. In the processing, based on determinations as to the conditions A to C including a determination as to whether or not there is reflection of scenery in the glass portions of the eyeglasses or the like, the imaging control device 13 determines whether or not an environmental situation corresponds to any of patterns 1 to 4. Then, based on a result of this determination, the imaging control device 13 controls the projector 5 and the camera 3 by switching the operation mode First, as shown in FIG. 5, in S100, the imaging control device 13 acquires information on environmental light. Specifically, based on a signal from the illuminance sensor 7, ambient brightness (in the vehicle compartment) (i.e., illuminance indicating the intensity of the environmental light) is detected.

Subsequently, in S110, the imaging control device 13 determines whether or not the illuminance provided by the environmental light is smaller (darker) than an illuminance threshold. This illuminance threshold represents a lower limit of brightness that enables an image to be taken (brightness which enables an analyzable facial image to be obtained). Here, if an affirmative determination is made, the processing advances to S120. If a negative determination is made, the processing advances to S130.

In S120, since the illuminance provided by the environmental light is smaller than the illuminance threshold and the environmental light is weak (i.e., in a dark state during the nighttime, etc.), only the condition A of "weak environmental light" is satisfied. Thus, in S120, it is determined that the environmental situation corresponds to the pattern 1 in FIG. 7. Accordingly, the projector 5 and the camera 3 are controlled to be in the operation mode (operation mode 1) corresponding to the pattern 1.

Specifically, as shown in FIG. 7 and FIGS. 4A and 4B, a control value for obtaining a clear facial image under the weak environmental light is set. That is, compared with the pattern 4 (or compared with the cases where the intensity of the light is in the "intermediate range"), the projector 5 is controlled so as to weaken illumination and increase the illumination time, while the control value for the camera 3 is set so as to increase the exposure time.

In S130, since it has been determined that the illuminance provided by the environmental light is greater than or equal to the illuminance threshold, the imaging control device 13 causes the projector 5 to project the light and the camera 3 to take an image by using a predetermined default control value (initial value).

For example, as the initial value, a control value that is set for cases where the intensity of the light is in the "intermediate range" can be used.

Subsequently, in S140, based on the facial image taken in S130, it is determined whether or not the eyeglasses are worn. If an affirmative determination is made, the processing advances to S150. If a negative determination is made, the processing advances to S170. Processing for detecting eyeglasses described in, for example, JP-4103495B and JP-4151341B can be used as the processing for determining whether or not the eyeglasses are worn by using the facial image. JP-4103495B and JP-4151341B are incorporated herein by reference.

Since it is determined in S110 that the condition A of "intense environmental light" is satisfied and it is determined in S140 that the condition B of "absence of worn eyeglasses" is satisfied, it is determined on S170 that the environmental situation corresponds to the pattern 2 in FIG. 7.

Therefore, it is regarded that even when the projector 5 does not the light, it is possible to obtain a facial image from which the states of the eyes are clearly recognizable. Thus, the operation mode is set to the operation mode 2 corresponding to the pattern 2, so that the projector 5 is not turned ON.

In S150, based on the facial image taken in S140, it is determined whether or not there is reflection of scenery in the glass portions of the eyeglasses. If an affirmative determination is made in S140, the processing advances to S160. If a negative determination is made in S140, the processing advances to S170. Note that, "processing for detecting reflection (in eyeglasses)" described in, e.g., JP-4103495B and JP-4151341B can be used as processing for determining whether or not there is reflection of scenery in the glass portions of the eyeglasses.

Because of the negative determination in S150, S170 is performed. In S170, it is determined that the environmental situation corresponds to pattern 3 in FIG. 7. This is because (i) it is determined in S110, that the condition A of "intense environmental light" is satisfied in S110, (ii) it is determined in S140 that the condition B of "presence of worn eyeglasses" is satisfied, and (iii) it is determined in S150 that the condition C of "absence of reflection" is satisfied.

Therefore, it is regarded in S170 that even when the projector 5 does not radiate the light, the situation makes it possible to obtain a facial image from which the states of the eyes are clearly recognizable. Thus, the operation mode is set to the operation mode 3 corresponding to the pattern 3, so that the projector 5 is not turned ON in the same manner as in the operation mode 2.

In S160, it is determined that the environmental situation corresponds to the pattern 4 in FIG. 7. This is because it is determined in S110 that the condition A of "Intense Environmental Light" is satisfied in S110, it is determined in S140 that the condition B of "Presence of Worn Eyeglasses" is satisfied, and it is determined in S140 that the condition C of "presence of reflection" is satisfied in S150.

Therefore, the operation mode 4 corresponding to the pattern 4 is set, so that the control the projector 5 and the camera 3 are controlled in the operation mode 4. Specifically, as shown in FIG. 7 and FIG. 4C, the control value are set, so that even when environmental light is intense and reflection is present in eyeglasses, it is possible to obtain the facial image from which the states of the eyes are clearly recognizable. That is, compared with the pattern 1 (or compared with the case where the intensity of light is in the "intermediate range"), the projector 5 is controlled to intensify illumination and reduce the illumination time, while a control value is set for the camera 3 so as to reduce the exposure time.

Then, in S180 subsequent to S120, S170 and S160, the projector 5 is driven to radiate light (or light is not radiated) in the operation mode set in each of Steps 120, 170, and 160, while the camera 3 is driven to take an image.

Subsequently, in S190, the imaging control device 13 recognizes the facial image (the taken image) taken in S180.

Specifically, the imaging control device 13 performs such processing as detecting the positions of the pupils of the eyes (e.g., the directions of the eyes) or the open/closed states of the eyes from the facial image (cf. JP 3316725B or JP 2008-276328A).

Also, from the obtained facial image, it is determined whether or not the facial image is appropriate for image analysis, i.e., whether or not control values such as, e.g., a radiation intensity, the radiation time, the exposure time, and the analog gain are appropriate.

Subsequently, in S200, the counters M1 and M2 are incremented (counted up).

Subsequently, in S210, it is determined whether or not the counter M1 becomes lager than a predetermined determination value n1. The predetermined determination value n1 is set so as to repeat the imaging for a given period of time. If an affirmative determination is made in S210, the processing advances to S220. If a negative determination is made in S210, the processing returns to S180 to repeat the same processing.

In S220, the imaging control device 13 performs the imaging (takes an image) for the given period. Accordingly, it is determined whether or not the control values should be changed (adjusted) in order to obtain a more desirable facial image (i.e., an image in which the states of the eyes are more clearly recognizable). If an affirmative determination is made in S220, the processing advances to S230. If a negative determination is made in S220, the processing advances to S240.

Note that the above control values are control values which are adjusted and set based on the obtained facial image in order to obtain a more desirable facial image. In other words, the control values are adjustment control values which are feedbacked and set based on data on the already obtained facial image. Examples of the adjustment control values include the radiation time, the exposure time, the analog gain, and the like.

In S240, the counter M1 is cleared, and the processing returns to S180

In S230, it is determined whether or not the counter M2 becomes larger than a predetermined determination value n2. The predetermined determination value n2 is set to prevent the change in foregoing adjustment control values for a given period of time. If an affirmative determination is made in S230, the processing advances to S260. If a negative determination is made in S230, the processing advances to S250.

In S250, the adjustment control values are changed because it is determined in S220 that the adjustment control values should be changed. The processing returns S180 via S240 to repeat the same processing.

In S260, the counter M2 is cleared because the given period of time has elapsed since the foregoing adjustment values were changed. Then, the processing returns to S100 to repeat the same processing. In the above procedure, the imaging control device 13 performing S110 can correspond to an example of environmental light determining section. The imaging control device 13 performing S150 can correspond to an example of eyeglass reflection determining section. The imaging control device 13 performing S120, S160, S170 can correspond to an example of light control section.

The present embodiment can involve the following technical effects. The imaging control device 13 performing S140 can correspond to an example of eyeglass determining section.

In the present embodiment, when it is determined that environmental light is intense, a pair of eyeglasses are worn, and there is reflection of the environmental light in the glass portions of the eyeglasses, the projector 5 and the camera 3 are controlled in the operation mode (operation mode 4) corresponding to pattern 4.

Specifically, compared to the case in pattern 1 described above (or compared to the case where the intensity of light is in the foregoing "intermediate range", the projector 5 is controlled so as to intensify illumination and reduce the illumination time, while a control value is set for the camera 3 so as to reduce the exposure time.

As a result, even when the environmental light is reflected by the glass portions of the eyeglasses, a facial image in which the states of the eyes (such as the positions of the pupils of the eyes or the open/closed states of the eyes) are clearly recognizable can be obtained. This allows the positions of the pupils of the eyes or the open/closed states of the eyes to be accurately recognized from the facial image. Therefore, it is possible to accurately detect the looking aside or dozing of the driver.

When illumination is intensified, the illumination time is reduced. Accordingly, it is possible to reduce discomfort given to the driver. When illumination is further intensified, the exposure time in the camera 3 is reduced to allow a facial image of a proper brightness to be obtained.

It should be noted that embodiments are not limited to the above illustrated embodiments, and embodiments can have various forms, examples of which will be described.

(1) A non-transitory computer readable medium may store a program that causes a computer to function as the above-described imaging control unit.

(2) In the above embodiment, the determinations as to all of the conditions A, B, and C are made, and the pattern is determined based on the results of the determinations. However, it may also be possible to determine the operation mode by making the determinations as to only the "intenseness/weakness of environmental light" and the "presence/absence of reflection by eyeglasses".

For example, when environmental light is intense and there is reflection in eyeglasses, the control operation may be performed in the operation mode 4. This is because, when there is reflection in eyeglasses, the eyeglasses are obviously worn. Consequently, there is no need to additionally determine the presence/absence of the eyeglasses.

Note that, in this case, patterns and the contents of control operations as illustrated in FIG. 8 may be adopted.

(3) In the above embodiment, the looking aside while driving or drowsy driving is detected from the facial image. However, the above embodiment is applicable to individual recognition to recognize an individual person based on the facial image having the eyes-related information for example.

(4) In the above embodiment, the intensity of environmental light is determined using the illuminance sensor. However, for example, it may also be possible to take an image such as a facial image using a camera without turning ON (or by turning ON) the projector and determine the intensity of environmental light from the brightness of the obtained image.

(5) It is possible to determine the nighttime or daytime based on clock time information from the clock IC and estimate the intensity of environmental light.

(6) When it is determined from the navigation device that, for example, the vehicle is running in a tunnel, it is possible to estimate that environmental light is weak.

According to the present disclosure, an imaging control device can be provided in various forms. For example, according to one example, an imaging control device controls a facial image taking apparatus which radiates light including infrared light from a light source to a face and which takes an image of the face to obtain a facial image by using an imaging unit. The imaging control device includes an environmental light determining section, an eyeglass reflection determining section and a light control section. The environmental light determining section determines an intensity of environmental light based on information from an environmental light sensing unit sensing the intensity of the environmental light. The eyeglass reflection determining section determines a degree of reflection by a pair of eyeglasses on the face based on the facial image. In cases where the environmental light determining section determines that the intensity of the environmental light is greater than or equal to a predetermined determination value and the eyeglass reflection determining section determines that the degree of the reflection by the eyeglasses is greater than or equal to a predetermined determination value, the light control section sets an intensity of the light radiated from the light source to a predetermined intensity that makes it possible to recognize states of eyes in the facial image.

In the above imaging control device, when it is determined that the intensity of the environmental light is greater than or equal to the predetermined determination value and the degree of reflection by the eyeglasses is greater than or equal to the predetermined determination value, the intensity of the light radiated from the light source is set to the predetermined intensity that makes it possible to recognize the states of the eyes in the facial image. The states of the eyes in the facial image may be, for example, the positions of the pupils of the eyes, the open/closed states of the eyes, or the like Accordingly, even in a situation in which the environmental light is reflected by the glass portions of the eyeglasses and the states of the eyes are hard to recognize, it is possible to radiate the light of a proper intensity. As a result, without scaling up the device or giving discomfort to a driver, it becomes possible to obtain a desirable facial image from which the states of the eyes are clearly recognizable. Because of this, it becomes possible to accurately sense the driver's state such as looking aside while driving, drowsy driving, and the like.

Note that, according to one example, the environmental light sensing unit may sense the intensity of the environmental light by using a illuminance sensor or the like. Alternatively, the environmental light sensing unit may sense the intensity of the environmental light by, for example, obtaining clock time from a clock and estimating the intensity of the environmental light from the obtained clock time, or by estimating the intensity of the environmental light based on map information from a navigation system (for instance, in a tunnel, the environmental light can be estimated to be weak).

Note that the predetermined intensity, which makes the states of the eyes in the facial image recognizable, can be determined in advance by experiments or the like.

The imaging control device may further include an eyeglass determining section that determines based on the facial image whether the pair of eyeglasses is present or absent. In cases where the eyeglass determining section that determines the pair of eyeglasses is worn and the eyeglass reflection determining section determines that the degree of the reflection by the eyeglasses is greater than or equal to the predetermined determination value, the light control section may set the intensity of the light radiated from the light source to the predetermined intensity.

According to the above configuration, the light control section can perform high accurate control of the intensity of the light radiated from the light source, because the light control section determines whether to perform the control of the intensity of the light based on a result of the determination made by the eyeglass determining section in addition to results of the determinations made by the environmental light determining section and the eyeglass reflection determining section. That is, the light control section determines perform the control of the intensity of the light, when the condition of wearing the eyeglasses is satisfied.

The imaging control device may set the predetermined intensity, so that the predetermined intensity, which is set in cases where the light control section sets the intensity of the light radiated from the light source to the predetermined intensity, is set larger than the intensity of the light from the light source in cases where the intensity of the environmental light is less than the predetermined determination value.

The above is an example of how to set the intensity of light. In this example, since the predetermined intensity is set higher than the intensity of the light in cases of low intensity of the environmental light, it becomes possible to clearly recognize the states of the eyes from the facial image.

The imaging control device may set a radiation time of the light from the light source, in such a manner that the radiation time of the light in cases where the light control section sets the intensity of the light radiated from the light source to the predetermined intensity is set shorter than the radiation time of the light in cases where the intensity of the environmental light is less than the predetermined determination value.

According to the above configuration, when the intensity of the radiated light is set to the predetermined intensity (i.e., the intensity is set larger than the intensity in the case of the weak environmental light), the radiation time is set shorter than the radiation time in the case of the weak environmental light. Accordingly, the driver's discomfort or the like can be reduced. That is, since the intense light may provide the driver or the like with discomfort feeling, the radiation time for the light is reduced.

The imaging control device may set an exposure time of the imaging unit in such a manner that the exposure time of the imaging unit in cases where the light control section sets the intensity of the light radiated from the light source to the predetermined intensity is set shorter than the exposure time of the imaging unit in cases where the intensity of the environmental light is less than the predetermined determination value.

According to the above configuration, when the intensity of the radiated light is set to the predetermined intensity (i.e., the intensity is set larger than the intensity in the case of the weak environmental light), the exposure time of the imaging unit is set shorter than the exposure time in the case of the weak environmental light. Accordingly, it is possible to inhibit the brightness of the facial image from being excessively increased. Therefore, the facial image from which the states of the eyes are more clearly recognizable can be obtained.

According to another example of the present disclosure, a non-transitory computer readable storage medium stores therein a computer-executable program that cause a computer to function as the environmental light determining section, the eyeglass reflection determining section and the light control section of the imaging control device. That is, the sections of the imaging control device can be implemented by the program for the computer.

The non-transitory computer readable storage medium may be, for example, a FD, a MO, a DVD-ROM, a CD-ROM, or a hard disk and may be loaded as necessary into a computer. Otherwise, it may also be possible to (i) record the program in the non-transitory computer readable storage medium such as a ROM or a back-up ROM or the like, (ii) incorporate the ROM or the back-up RAM into the computer, and (iii) use the program.

The present disclosure is not limited the above embodiments and modifications thereof. That is, the above embodiments and modifications thereof may be modified in various ways without departing from the sprit and scope of the present disclosure.

What is claimed is:

1. An imaging control device for controlling a facial image taking apparatus which radiates light including infrared light from a light source to a face and takes an image of the face to obtain a facial image by using an imaging unit, the imaging control device comprising:

an environmental light determining section that determines an intensity of environmental light based on information from an environmental light sensing unit sensing the intensity of the environmental light;

an eyeglass reflection determining section that determines a degree of reflection by a pair of eyeglasses based on the facial image; and a light control section that, in cases where the environmental light determining section determines that the intensity of the environmental light is greater than or equal to a first predetermined determination value and the eyeglass reflection determining section determines that the degree of the reflection by the eyeglasses is greater than or equal to a second predetermined determination value, sets an intensity of the light, which is radiated from the light source, to a predetermined intensity that makes states of eyes in the facial image recognizable, wherein:

the predetermined intensity, which is set in cases where the light control section sets the intensity of the light radiated from the light source to the predetermined intensity, is set larger than the intensity of the light from the source in cases where the intensity of the environmental light is less than the first predetermination value, and in cases where the light control section sets the intensity of the light radiated from the source to the predetermined intensity, an exposure time of the imaging unit is set shorter than the exposure time of the imaging unit in cases where the intensity of the environmental light is less than the first predetermined determination value.

2. The imaging control device according to claim 1, further comprising: an eyeglass determining section that determines based on the facial image whether the pair of eyeglasses is present or absent, wherein, in cases where the eyeglass determining section that determines the pair of eyeglasses is worn and the eyeglass reflection determining section determines that the degree of the reflection by the eyeglasses is greater than or equal to the second predetermined determination value, the light control section sets the intensity of the light, which is radiated from the light source, to the predetermined intensity.

3. The imaging control device according to claim 1, wherein: in cases where the light control section sets the intensity of the light radiated from the light source to the predetermined intensity, a radiation time of the light from the light source is set shorter than the radiation time of the light from the light source in cases where the intensity of the environmental light is less than the first predetermined determination value.

4. A non-transitory computer readable storage medium storing therein a computer-executable program that causes a computer to function as the environmental light determining section, the eyeglass reflection determining section and the light control section of claim 1.

* * * * *